US006941708B2

(12) United States Patent
McCracken et al.

(10) Patent No.: US 6,941,708 B2
(45) Date of Patent: Sep. 13, 2005

(54) REDUCED FRICTION COUPLING FOR SHORING APPARATUS

(75) Inventors: Robert McCracken, Des Moines, IA (US); Bob Jennings, Des Moines, IA (US); Chris Beranek, Des Moines, IA (US)

(73) Assignee: Wilian Holding Co., Des Moines, IA (US)

( * ) Notice: Subject to any disclaimer, the term of this patent is extended or adjusted under 35 U.S.C. 154(b) by 0 days.

(21) Appl. No.: 10/613,715

(22) Filed: Jul. 3, 2003

(65) Prior Publication Data

US 2005/0000171 A1 Jan. 6, 2005

(51) Int. Cl.[7] ................................................ E04D 15/00

(52) U.S. Cl. .................... 52/126.1; 52/126.6; 52/126.7; 248/161

(58) Field of Search ............................ 52/126.1, 126.5, 52/126.6, 126.7, 263, 651.1; 248/161, 410, 411; 403/374.2

(56) References Cited

U.S. PATENT DOCUMENTS 3,581,420 A * 6/1971 Mollet et al. ................. 40/604
3,924,370 A * 12/1975 Cauceglia et al. ......... 52/126.6
3,982,364 A * 9/1976 Horvath ..................... 52/126.6
4,862,654 A * 9/1989 Macias ...................... 52/126.1
4,922,670 A * 5/1990 Naka et al. ................ 52/126.6
4,996,804 A * 3/1991 Naka et al. ................ 52/126.6
5,619,834 A * 4/1997 Chen ........................... 52/509
5,623,792 A * 4/1997 Crumpacker ............... 52/126.7
6,484,450 B1 * 11/2002 Suprina et al. .................. 52/8

* cited by examiner

*Primary Examiner*—Brian E. Glessner
*Assistant Examiner*—Basil Katcheves
(74) *Attorney, Agent, or Firm*—Kent A. Herink; Daniel A. Rosenberg; Emily E. Harris

(57) ABSTRACT

A reduced friction coupling which interconnects a lower, supporting member and an upper, supported member of a concrete forming apparatus to reduce the force required to lower the height of the forming apparatus under load on the members by a formed concrete structure. Two or more polymeric washers are received about the supporting member between a threaded nut which is used for adjusting the height of the forming apparatus and the supported member. The polymeric washers reduce by a surprising amount the force required to retract the nut under load. Washers of molybdenum disulphide filled nylon can support up to 10,000 pounds per square inch and reduce the force required to retract the nut by at least sixty percent under such a load compared to the force required if a single steel washer is used.

1 Claim, 3 Drawing Sheets

REDUCED FRICTION COUPLING FOR SHORING APPARATUS

BACKGROUND OF THE INVENTION

1. Field of the Invention

The invention relates generally to a reduced friction coupling which assists in connecting and disconnecting of two members of a supporting apparatus and, more specifically, to a reduced friction coupling device which interconnects a lower, supporting member and an upper, supported member of a concrete forming apparatus to permit quick and easy disassembly of the supporting member even under load from a formed concrete structure.

2. Background of the Prior Art

Concrete forming apparatus is in wide use in the construction of buildings, bridges, and other concrete structures. The formwork against which the concrete is formed is often held in place by shoring apparatus. In forming horizontal concrete building sections, such as floors and the like, the substantially horizontally disposed formwork is supported on a plurality of vertical support members which are capable of withstanding the applied load of uncured concrete poured upon the formwork. Once the poured concrete has set to a sufficient degree, the formwork is stripped from the concrete structure. Whether the concrete structure is substantially vertical or horizontal, or virtually any other orientation, it is frequently found that a substantial force is exerted by the formed concrete structure against the formwork and hence the structural members which support the formwork. By way of example, if the poured concrete structure is a horizontally disposed floor or ceiling, a significant proportion of the weight of the concrete structure will bear against the formwork and hence against the support members. Accordingly, in order to strip the formwork away from the poured concrete structure, it is necessary to reduce the vertical extension of the support members so as to be able to lower the formwork.

Commonly, the formwork is commonly supported by a lower support member made of steel which supports an upper, supported member, often made of aluminum, which is interconnected to the supporting member by a cast steel wing nut threaded on the supporting member. A pair of steel washers are interposed between the wing nut and the supported member. The wing nut is rotated relative to threads in the supporting member to move the supporting and supported member relative to each other so as to reduce the vertical height of the support member and move the formwork away from the poured concrete structure. The load on the support member by the poured concrete structure, however, makes it extremely difficult to loosen the wing nut. It is common for workers to overcome this resistance by extending the lever arm for moving the wing nut by using a section of pipe connected to the wing nut and then either hammering on the pipe in order to forcibly move the wing nut or, in more difficult circumstances, using a fork lift or other powered device to push against the pipe and thereby forcefully rotate the wing nut to strip the formwork from the formed concrete structure. This way of stripping the formwork has several disadvantages. It is difficult for a single laborer to accomplish, it often requires the use of ancillary equipment, and it requires the exertion of extremely high forces on the support members.

The high force required to release the wing nut is due to several factors. The primary factor was believed to be a result of the high coefficient of friction between the cast wing nut and the threads of the steel supporting member. There is also a high coefficient of friction between the steel washers and the aluminum supported member. Further, it is common for galling of the relatively soft facing surface of the supporting member to occur during tightening and loosening of the wing nut.

SUMMARY OF THE INVENTION

The invention consists of a reduced friction coupling for assisting in the assembly and disassembly of a lower supporting member and an upper supported member that are used to hold in position formwork of a concrete form apparatus. The lower supporting member and the upper supported member are moveable relative to each other along their common axis by a threaded nut on the supporting member so as to increase or decrease their relative separation. The reduced friction coupling of the present invention consists of a pair of polymeric washers that interposed between the nut and the supported member. The pair of polymeric washers reduces by a surprising amount the force that is required to back off the nut when stripping the formwork even though it is typically under an extreme load.

In the preferred embodiment, the washers are comprised of nylon and are capable of supporting a load of 10,000 pounds per square inch.

An object of the present invention is to provide a reduced friction coupling for quickly and easily reducing the relative separation distance of a supporting member and supported member which it interconnects.

Another object of the present invention is to provide a coupling which quickly and easily reduces the load between two support members of a support apparatus to allow removal of the support apparatus.

A further object of the present invention is to provide a reduced friction coupling that interconnects support members of a support apparatus for concrete formwork which permits quick and easy stripping of supported concrete formwork after the concrete has sufficiently cured.

These and other objects of the invention will be made apparent upon a review and understanding of this specification, the associated drawings, and the appended claims.

DETAILED DESCRIPTION OF PREFERRED EMBODIMENTS

Figure 1:
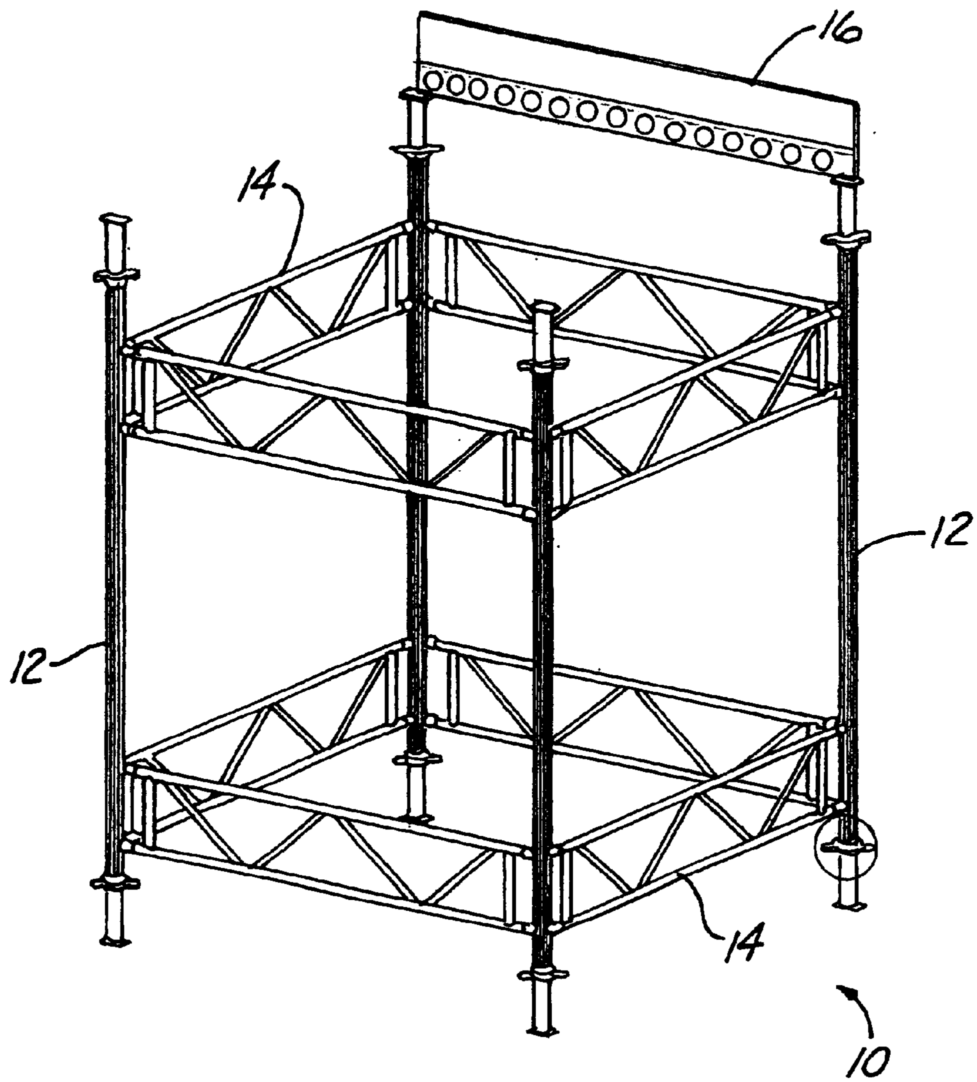
FIG. 1 is a perspective view of a typical concrete formwork apparatus in which the reduced friction coupling of the present invention is used.

Referring to FIG. 1, there is illustrated, generally at 10, formwork apparatus for supporting concrete as it is being used to form a building component, or the like. The formwork includes a plurality of shoring posts 12 that are interconnected by horizontal trusses 14. The shoring posts 12 support a horizontal concrete form upon which concrete is poured.

Figure 2:
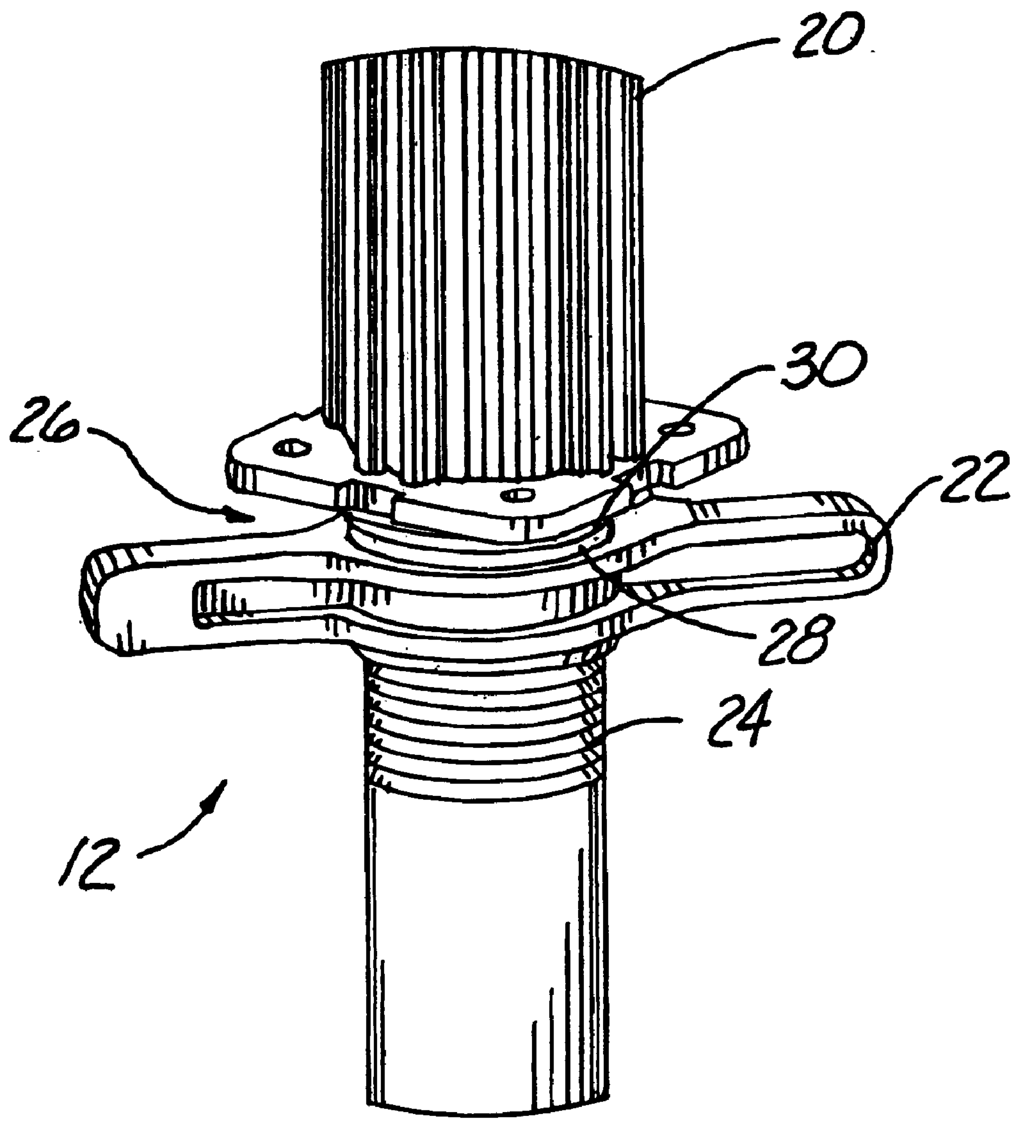
FIG. 2 is an enlarged view of the reduced friction coupling of the present invention between a supporting member and a supported member of the concrete formwork apparatus.
Figure 3:
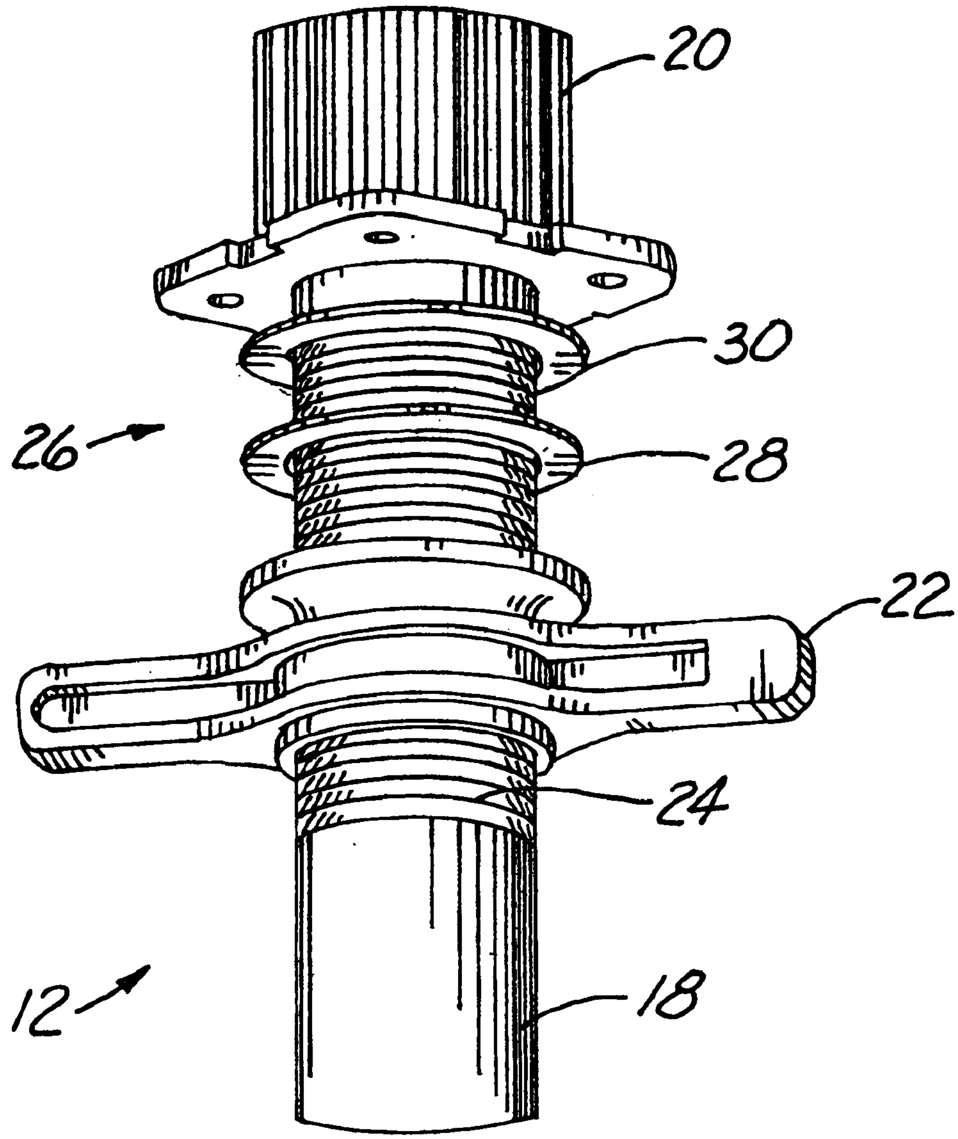
FIG. 3 is an exploded view of the apparatus depicted in FIG. 2.

The shoring posts 12 are comprised of a supporting member 18, the upper end of which is received inside a supported member 20 (FIG. 2). A wing nut 22 is threaded onto threads 24 formed in the supporting member 18 adjacent the upper end portion thereof. A reduced friction coupling 26 comprises a lower annular ring or washer 28 and an upper annular ring or washer 30. The washers 28, 30 are received about the upper end portion of the supporting member 18 between the wing nut 22 and the lower end portion of the supported member 20. The height of the shoring posts 12 are adjusted by rotation of the wing nut 22 about the threads 24.

As is common in the concrete form industry, the supported formwork must be held substantially rigidly in place while the concrete is poured and cured. After the concrete has set sufficiently, the formwork is stripped from the poured structure and moved to the next pouring location. Thus, the relative displacement between the supporting member 18 and the supported member 20 must be held in the appropriate adjusted position while the concrete is poured and begins to set and yet they must be allowed to move relatively toward each other to reduce the overall height of the shoring apparatus 10 in order to strip the horizontally disposed form 16 from the poured building member. In use, the shoring posts 12 are assembled and the wing nut 22 is adjusted to position the horizontal concrete form 16 at the appropriate height. After the concrete has been poured on the horizontal form 16 and it has cured sufficiently, the formwork 10 is removed, most typically to be moved to a new position at the construction location for an additional cycle of use. To remove the formwork 10, the horizontal form 16 must be stripped away from the formed concrete by reducing the height of the shoring posts 12 by retraction of the wing nut 22.

In the prior art, a single steel washer is used in place of the pair of washers 28, 30. Steel was required because of the ability of the steel washer to carry the load of the concrete. The load of the concrete on the form 16 made retraction of the wing nut 22 very difficult, in part because of the high coefficient of friction between the cast wing nut 22 and the threads 24 or the steel supporting member 18, and also because rotation of the wing nut 22 imparts a rotational force on the steel washer which in turn will also impart a rotational force on the lower end of the supported member 20. The relatively high coefficients of friction between each of the elements and the relative softness of the aluminum used in the supported member 20 further increase the difficulty in retracting the wing nut 22. While the use of a pair of steel washers acts to reduce in most circumstances the force required to retract the wing nut 22, the force still presents problems in use of the shoring posts 12.

In the present invention, the washers 28, 30 are made of a polymeric material that has a reduced coefficient of friction and sufficient strength to avoid being harmed by the loads experienced by the load of the concrete during use in the concrete formwork apparatus. Suitable materials include polymeric materials, such as nylon, polyurethane, polytetrafluoroethane, or the like. Preferably, the coefficient of friction of the polymeric material is less than 0.4 and most preferably between about 0.05 and 0.25. Nylatron® is a trademark of Polymer Corporation, Reading, Pa., for its nylon. Nylatron® GS is a nylon filled with molybdenum disulphide and has a strength that is high enough to resist damage at up to at least 10,000 pounds per square inch.

It has been found that the use of a pair of Nylatron® GS washers having a thickness of one-eighth inch, and inner diameter of three and five-eighths inches and an outer diameter of five inches withstand up to 30,000 pounds of force on the shoring post 12 without damage. Moreover, at this load, the amount of torque required to retract the wing nut 22 is reduced from 1200 foot-pounds when a single steel washer is used to 350 foot-pounds when two Nylatron® washers 28, 30 of the specifications described above are used.

Although the invention has been described with respect to a preferred embodiment thereof, it is to be also understood that it is not to be so limited since changes and modifications can be made therein which are within the full intended scope of this invention as defined by the appended claims.

I claim:

1. In a shoring apparatus including a shoring post for supporting a load and wherein the shoring post consists of a steel supporting member, an aluminum supported member received about an upper end portion of the supporting member, and a cast steel wing nut received about a threaded end potion of the supporting member below the supported member, a reduced friction coupling received about the supporting member between the nut and the supported member for reducing the force required to retract the nut under load, comprising two or more molybdenum disulphide filled nylon washers which reduce the force required to retract the nut under a load of up to about 10,000 pounds per square inch by between about sixty percent and about eighty percent from the force required if a single steel washer was used in place of the molybdenum disulphide filled nylon washers.

* * * * *